(12) United States Patent
Korkishko et al.

(10) Patent No.: US 7,793,105 B2
(45) Date of Patent: Sep. 7, 2010

(54) METHOD AND APPARATUS FOR LOCAL DOMAIN MANAGEMENT USING DEVICE WITH LOCAL AUTHORITY MODULE

(75) Inventors: Tymur Korkishko, Suwon-si (KR); Kyung Hee Lee, Yongin-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 1044 days.

(21) Appl. No.: 11/511,363

(22) Filed: Aug. 29, 2006

(65) Prior Publication Data

US 2007/0234432 A1 Oct. 4, 2007

(30) Foreign Application Priority Data

Mar. 29, 2006 (KR) .................... 10-2006-0028369

(51) Int. Cl.
*H04L 9/32* (2006.01)
(52) U.S. Cl. .................... 713/175; 713/168; 726/2; 726/3
(58) Field of Classification Search ............... 713/182, 713/185, 156, 168, 175; 707/201; 726/2–5, 726/10
See application file for complete search history.

(56) References Cited

U.S. PATENT DOCUMENTS

| | | | |
|---|---|---|---|
| 2002/0112171 A1* | 8/2002 | Ginter et al. ............... 713/185 |
| 2003/0076955 A1 | 4/2003 | Alve et al. |
| 2004/0062400 A1 | 4/2004 | Sovio et al. |
| 2004/0088333 A1* | 5/2004 | Sidman .................... 707/201 |
| 2004/0088541 A1* | 5/2004 | Messerges et al. ......... 713/156 |
| 2004/0103312 A1 | 5/2004 | Messerges et al. |
| 2005/0044361 A1 | 2/2005 | Chang et al. |
| 2005/0210261 A1 | 9/2005 | Kamperman et al. |
| 2005/0229004 A1 | 10/2005 | Callaghan |
| 2005/0246531 A1* | 11/2005 | Fabre ....................... 713/168 |

* cited by examiner

*Primary Examiner*—Kimyen Vu
*Assistant Examiner*—Edward Zee
(74) *Attorney, Agent, or Firm*—NSIP Law (57) ABSTRACT

A method and device for local domain management are provided and include a local domain authority device. The local domain authority (LDA) device includes a location limited channel (LLC) interface for transmitting and receiving information of devices which are positioned within a limited location and a (LDA) module for authenticating a device which is selected as a member of a domain from the devices, transmitting device authentication information corresponding to the domain, to the authenticated device via the LLC interface, and registering the authenticated device as a member of the domain. The method and device provide an easy and secure means for domain management.

43 Claims, 5 Drawing Sheets

METHOD AND APPARATUS FOR LOCAL DOMAIN MANAGEMENT USING DEVICE WITH LOCAL AUTHORITY MODULE

CROSS-REFERENCE TO RELATED APPLICATIONS

This application claims the benefit under 35 U.S.C. §119(a) of Korean Patent Application No. 10-2006-0028369, filed on Mar. 29, 2006, in the Korean Intellectual Property Office, the entire disclosure of which is hereby incorporated by reference.

BACKGROUND OF THE INVENTION

1. Field of the Invention

The present invention relates to the protection of digital contents. More particularly, the present invention relates to a domain management method and device which can create and delete a domain, add a device to the domain, or delete the device from the domain, so as to protect digital contents.

2. Description of Related Art

Digital content protection is a very important issue for content owners. If there is no content protection mechanism, content owners cannot receive a profit from a distributed content since anyone can freely access and utilize the distributed content. Accordingly, content owners usually implement some mechanism that allows them to protect the content from unauthorized access and consumption. Typically, Digital Rights Management (DRM) is involved for protection of digital contents.

One method of DRM protection allows a group of devices to share content. In this instance, the group of devices is referred to as a single domain and the devices belonging to the single domain are allowed to share content. Such devices may, for example, have the same account information on a content provider server and share access to digital content. A user may access the content that is allowed for the domain using any of the devices.

Various types of payment methods may be utilized when providing access to the content that belongs to the single domain. As an example, an owner of the devices that belong to the single domain may freely access the content that is purchased by the owner, using any of the devices of the domain. Another payment method restricts a total number of accesses to the devices of the domain. In this instance, only the total number of accesses is restricted according to a payment, no matter how the user accesses the content using any of the domain devices. This type of DRM system is very convenient to both content owners and content consumers.

However, content consumers and device manufacturers may experience problems with management of the domain of devices. A first problem is that a device must have the ability to access the Internet, so as to be registered with a content provider or a digital rights issuer. Namely, according to a conventional art, since the device needs to be added to the domain by accessing a rights issuing server via a network, the device must have a network communication function. Accordingly, when manufacturing the device, device manufacturers must include a network-enabled function in the device, which imposes additional costs. Also, the user cannot register legacy devices, which have no network-enabled function, to the domain. Generally, the network-enabled function is not included in devices such as an MP3 player, a digital camera, and the like. Accordingly, such devices cannot use a domain function of DRM system according to the conventional art. Another problem is that the user has to wait a relatively long period of time to receive an authorization for the device that requests a domain membership. According to the conventional art, the authorization is usually granted by an external trusted entity, for example a rights issuer. Accordingly, it takes a very long time to establish contact with the external trusted entity. Still another problem is that all the member devices that constitute the domain must be registered when creating the domain. Accordingly, an operation of changing the member devices becomes very complicated and inflexible. Also, although all the member devices of the domain must be registered when creating the domain, it is not easy to make all the devices ready to use the content when purchasing the content. Accordingly, it is not realistic to register all the member devices to the domain, when creating the domain. Consequently, DRM methods using the domain described above are not widely utilized.

Accordingly, there is a need for an improved domain management method and device that allows a domain membership even for devices that have no ability to access a network, and that provides an easy and secure device enrollment that increases user convenience of domain management.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention provide a domain management method and device which enables even devices that have no ability to access a network, to utilize a domain function of a DRM system.

An aspect of exemplary embodiments of the present invention also provides a domain management method and device which can grant an authorization quickly when a user requests a domain membership of a device.

An aspect of exemplary embodiments of the present invention also provides a domain management method and device which can create a domain and also easily include an additional device in the domain.

According to an exemplary aspect of the present invention, there is provided a local domain authority device including a location limited channel (LLC) interface for transmitting and receiving information of devices which are positioned within a limited location and a local domain authority (LDA) module authenticating a device which is selected as a member of a domain from the devices, transmitting device authentication information corresponding to the domain, to the authenticated device via the LLC interface, and registering the authenticated device as a member of the domain.

In this instance, the authentication information includes a signature which is signed with an LDA private key of the local domain authority device with respect to a domain-based device identifier which is assigned to the authenticated device, a local domain authority (LDA) identifier which is assigned to the local domain authority (LDA) device by a rights issue server and a hash value of a device public key certificate of the authenticated device.

According to another exemplary aspect of the present invention, there is provided a domain management method including receiving information of devices which are positioned within a limited location from a local domain authority device at the local domain authority device, authenticating a device which is selected as a member of a domain from the devices, transmitting device authentication information corresponding to the domain, to the authenticated device and registering the authenticated device as a member of the domain.

According to still another exemplary aspect of the present invention, there is provided a domain management method including creating a domain in a local domain authority device and receiving information of devices positioned in a limited location from the local domain authority device via a location limited channel (LLC) interface, and registering the selected device from the devices as a member of the domain.

According to yet another exemplary aspect of the present invention, there is provided a domain management method including receiving a device public key certificate of a local domain authority device, a device identifier of the local domain authority device and domain information corresponding to a domain to be created, from the local domain authority device, verifying the device public key and the device identifier and transmitting a domain public key, a domain public key certificate, and a domain private key corresponding to the domain, to the local domain authority device.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will become more apparent from the following detailed description, taken in conjunction with the accompanying drawings, in which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
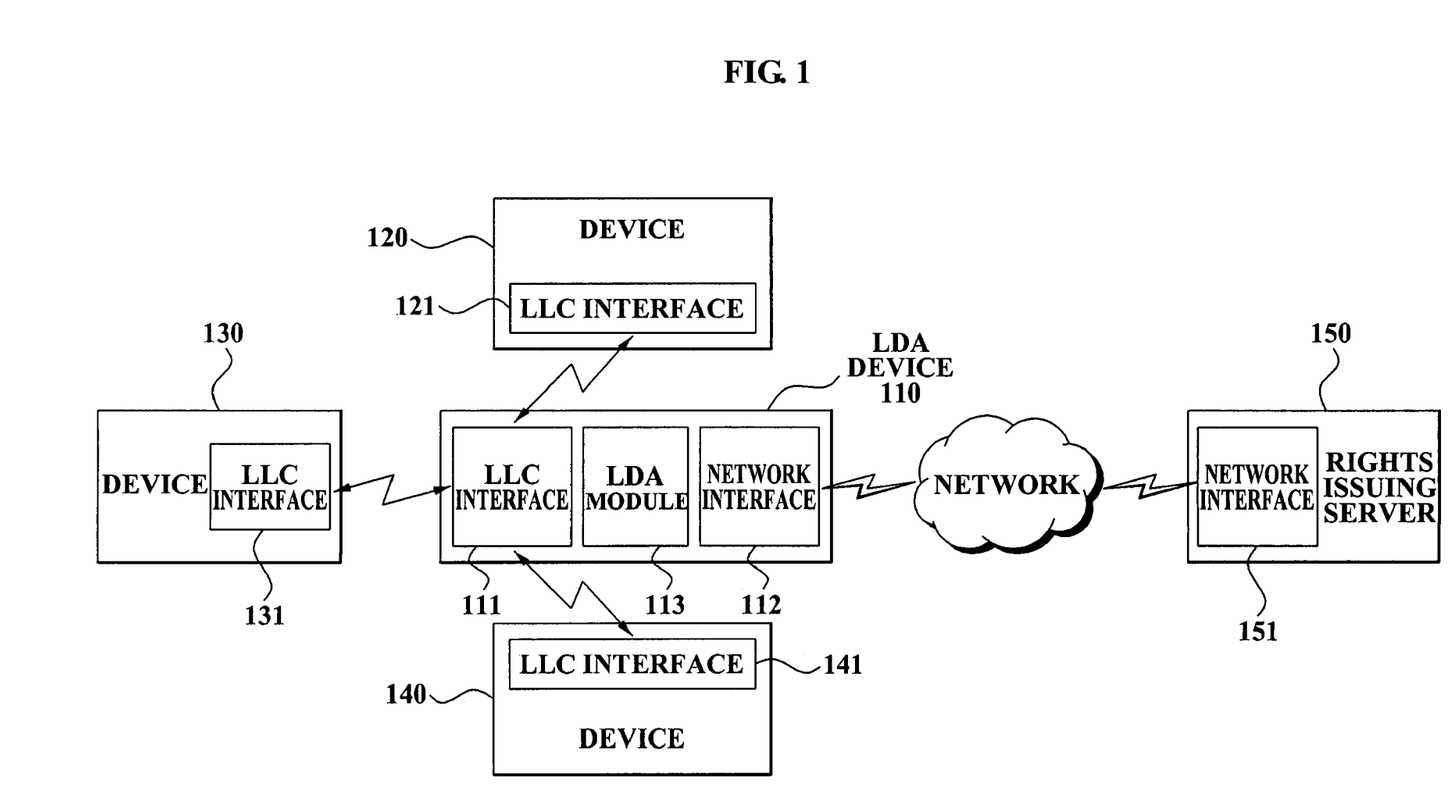
FIG. 1 is a diagram illustrating a connection between a rights issuing server and a user device which is selected as an LDA device according to an exemplary embodiment of the present invention.

FIG. 1 is a diagram illustrating a connection between a rights issuing server and a user device which is selected as a local domain authority (LDA) device according to an exemplary embodiment of the present invention.

According to an exemplary embodiment, all devices 110, 120, 130 and 140 that desire to become members of a local domain include location limited channel (LLC) interfaces 111, 121, 131 and 141, respectively. In this instance, each of the LLC interfaces 111, 121, 131 and 141 is a communication channel interface capable of communicating with a corresponding device which is positioned within a certain location or distance, and thus, is distinguished from a network interface capable of communication with the counter party device without a limited location. Examples of an LLC includes an infrared communication channel, a short range wireless communication channel, for example Bluetooth, a wire communication channel with a limited length cable, an ultrasonic channel, and the like. The location-unlimited network interface includes an Ethernet interface which supports an Internet-enabled function, and the like.

According to an exemplary embodiment, each of the devices 110, 120, 130 and 140 includes a device public key, a device private key, and a device public key certificate, for authentication. The device public key, the device private key, and the device public key certificate may be stored in each of the devices 110, 120, 130 and 140 by the device manufacturer. Also, each of the devices 110, 120, 130 and 140 includes a unique device identifier. The device identifier is for identifying the device, and may include, for example, a unique serial number of the device, a name of the device, manufacturer identification data, and the like. The device identifier may also be stored in the device when manufacturing the device.

In an exemplary embodiment, a user selects the device 110 which is installed with a local domain authority (LDA) module 113, from the user's devices, and utilizes the selected device 110 for an LDA device. In this instance, the LDA module 113 is in charge of local domain management. As an example, the LDA module 113 authenticates the device which is selected as a member of a domain from the user's devices, and transmits device authentication information corresponding to the domain, to the authenticated device via the LLC interface, and registers the authenticated device as a member of the domain. All devices that join the domain do not necessarily include an LDA module 113. Only a device which will be used for the LDA device is required to include the LDA module 113. When a plurality of devices among the user's devices include an LDA module 113, the user may select one of the plurality of devices with respect to one domain and utilize the selected device for the LDA device. Furthermore, although the selected device includes an LDA module 113, the selected device may operate as only a member device, not managing the local domain.

The LDA device 110 includes the LLC interface 111 for making a location limited communication with other devices. The LLC interface 111 is utilized for exchanging domain management information with other devices.

Also, the LDA device 110 includes a network interface 112 for communicating with a rights issuing server 150. According to an exemplary embodiment, a network interface 112 is required for only the LDA device 110, but not required for other devices. Namely, according to an exemplary embodiment, although other devices may not include a network interface 112, the other devices may join the domain to access digital contents.

When installing the LDA module 113 to a mobile phone including an LLC interface 111 and a network interface 112, the mobile phone may be utilized as the LDA device 110. In this case, the user may select the mobile phone for the LDA device 110, and add the user's other devices, for example an MP3 player, a digital camera, and other home networking equipment, in the domain by using the mobile phone. Accordingly, the user's other devices may utilize the domain function for DRM, even without a network communication function.

Also, the LDA device 110 may include a device public key, a device private key, a device public key certificate, or a device identifier like other devices.

The rights issuing server 150 communicates with the LDA device 110 via a network interface 151. In an exemplary embodiment, the rights issuing server 150 is not required to communicate with all other devices that joined the domain. The rights issuing server 150 communicates with only the LDA device 1 10 corresponding to the domain.

An exemplary domain management procedure is different, depending upon an amount of rights for domain management that the rights issuing server 150 has delegated to the LDA device 110. For example, the domain management rights include various types of rights, such as full rights and no-rights. When full rights are delegated, the LDA device 110 manages the domain using its own resources and authenticates devices. In such an exemplary case, the rights issuing server 150 is only notified with respect to domain management actions that are optionally performed by the LDA device 110. When no-rights are delegated, the LDA device 110 operates as a management proxy, and transmits all information to the rights issuing server 150. The rights issuing server 150 then performs all necessary actions for the domain management and notifies the LDA device 110 of results of the actions. Even in this exemplary case, the devices that join the domain do not require a network interface. When the rights issuing server 150 partially delegates the LDA device 110 with rights, the domain management procedures are performed by the LDA device 110 and the rights issuing server 150.

The user registers his/her own device 110 having an LDA with the rights issuing server 150, so as to create a local domain. In response thereto, the rights issuing server 150 transmits an LDA public key, an LDA private key, an LDA public key certificate, an LDA identifier, and domain credentials, to the device 110 having the LDA. The LDA module 113 may utilize the transmitted information for communicating with the rights issuing server 150 or signing authentication information for other devices 120, 130 and 140. Also, the devices of the domain utilize the domain credentials to access contents of the domain. Namely, when accessing a corresponding content, an access to the content is allowed according to the domain credentials.

In an exemplary embodiment, the LDA device 110 utilizes the LLC interface 111 to contact the other devices 120, 130 and 140 and exchange information. The user may discover devices to form a local domain using the LDA device 110. In this instance, a mobile phone which is installed with the LDA module 113 may be used for the LDA device 110. The user may select devices to be added to the local domain, from the discovered devices. Such an access is very natural to the user. As an example, the user may discover devices 120, 130 and 140 which are positioned in a certain location or distance from the LDA device 110, using an infrared location limited channel. Also, the discovered devices 120, 130 and 140, and the LDA device 110 exchange information via the LLCs. More specifically, each of the devices 120, 130 and 140 may transmit a device identifier and a device public key certificate to the LDA device 110. The LDA device 110 verifies the received device identifier and device public key certificate from the discovered devices 120, 130 and 140. Information of the discovered or the verified devices 120, 130 and 140 may be displayed on a display portion of the LDA device 110. Accordingly, the user may point and click devices to add to the local domain, from the displayed devices. The LDA device 110 transmits domain credentials and device authentication information to the selected devices. Through this, the selected devices may prove membership in the domain by sending the device authentication information to the LDA device 110, other devices or the rights issuing server 150.

The user manages local domains of the devices 120, 130 and 140 using the device 110 with the LDA. The device 110 with the LDA contacts other devices 120, 130 and 140, and thereby exchanges information with the devices 120, 130 and 140, registering the same to the local domain. The device 110 with the LDA may be entrusted with an authorization for domain management, from the rights issuing server 150. In this instance, the domain management includes at least one of creating a domain, adding a device to the domain, deleting a device from the domain, and deleting the domain. According to an exemplary embodiment of the present invention, the device 110 with the LDA may contact the rights issuing server 150 and receive the authorization for managing the local domain.

In an exemplary embodiment of the present invention, a device managing a domain is an LDA device which includes an LDA module. The LDA device includes an LDA public key and an LDA private key for an authorization. The LDA device may receive the LDA public key and the LDA private key using various methods. One method receives information on the LDA public key and the LDA private key from the rights issuing server 150, before the LDA device creates a domain. In another method, the LDA module 113 may create information on the LDA public key and the LDA private key by itself.

Since the security of the domain is an important issue, the LDA device 110 or the rights issuing server 150 may maintain a device revocation list. The device revocation list contains information on devices which are known to have been revoked by the LDA device 110 or the rights issuing server 150 for some reason. Accordingly, a device which is registered to the device revocation list may be regarded to have some type of security problem. Several third-parties, for example content providers and device manufacturers, may periodically provide update information of the device revocation list to the LDA device 110 or the rights issuing server 150. Depending upon an amount of rights for device authentication that is entrusted to the LDA device 110 by the rights issuing server 150, a local device revocation list and a global device revocation list may be utilized. The local device revocation list is a device revocation list which is maintained in the LDA device 110, and utilized when the LDA device 110 verifies the device revocation list. The global device revocation list is a device revocation list which is maintained in the rights issuing server 150 and utilized when the rights issuing server 150 verifies the device revocation list. At least one of the local device revocation list and the global device revocation list may be maintained. When maintaining both the local device revocation list and the global device revocation list, the rights issuing server 150 updates its global device revocation list and transmits update information of the device revocation list to the LDA device 110, so that the LDA device 110 may update the local device revocation list.

Hereinafter, an exemplary LDA device that includes an LDA module, and when domain management operations of the LDA device are performed in the LDA module will be described.

Figure 2:
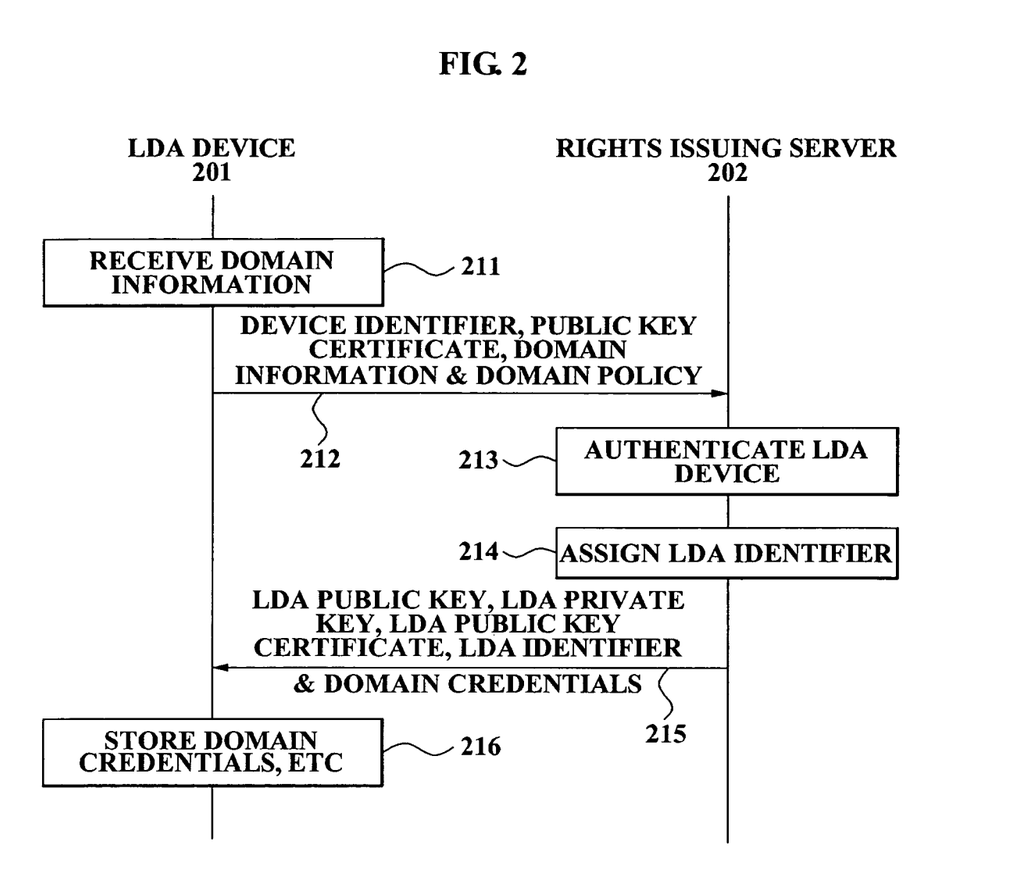
FIG. 2 is a flowchart illustrating a domain creation method according to an exemplary embodiment of the present invention.

FIG. 2 is a flowchart illustrating a domain creation method according to an exemplary embodiment of the present invention.

A user may create an additional domain using an LDA device 201 with an LDA module. In operation 211, the LDA device 201 receives domain information of a domain to be created, from the user, so as to create the additional domain. In this instance, the domain information includes a domain name. Also, the domain information may include a domain description and other information associated with the domain. The user inputs the domain information into the LDA device 201 using an input device.

In operation 212, the LDA device 201 transmits its device identifier and the domain information to a rights issuing server 202. According to an exemplary embodiment of the present invention, the LDA device 201 transmits its device public key certificate and domain policy to the rights issuing server 202. The LDA device 201 may also transmit device identification and domain information to the rights issuing server 202. The domain policy may be input by the user. In this instance, the domain policy may reflect a user's intention with respect to a maximum number of devices that can be included in the domain. As an example, the user may determine the number of devices for one domain as 10 devices. The LDA device 201 consults the domain policy when managing the domain. When the device manufacturer manufactures the LDA device 201, the device identifier and the device public key certificate of the LDA device 201 may be stored in the LDA device 201.

In operation 213, the rights issuing server 202 authenticates the LDA device 201, based on the received information from the LDA device 201. Specifically, the rights issuing server 202 may authenticate the LDA device 201 by verifying the device identifier and the device public key certificate of the LDA device 201.

In operation 214, when the LDA device 201 is successfully authenticated, the rights issuing server 202 assigns an LDA identifier to the LDA device 201.

In operation 215, the rights issuing server 202 transmits a domain private key of the domain, an LDA public key, an LDA private key, an LDA public key certificate, the assigned LDA identifier and domain credentials, to the LDA device 201. In this instance, the domain private key is used for an authentication associated with the domain. The LDA public key may have been signed by the rights issuing server 202 or a third device which was trusted by the rights issuing server 202. The domain credentials include a domain public key, the domain private key, and a domain public key certificate. According to an exemplary embodiment of the present invention, the rights issuing server 202 may transmit only a portion of the information, not all the information, to the LDA device 201. To securely transmit the domain credentials, the rights issuing server 202 may encrypt the domain private key using the device public key of the LDA device 201. Also, other methods may be utilized for the secure transmission of the domain credentials. As an example, the LDA device 201 and the rights issuing server 202 may perform a key establishing protocol and establish a common key. Also, the LDA device 201 may perform encryption and decryption of the domain credentials using the common key. The LDA device 201 receives the domain credentials and decrypts the received domain credentials. Also, in operation 216, the LDA device 201 stores the domain private key and credentials in a secure manner. As an example, the LDA device 201 may store the domain private key in an Electrically Erasable and Programmable Read Only Memory (EEPROM).

When a device with an LDA module receives domain credentials, the device may manage a created domain. Namely, the device may add another device to the domain or delete the other device from the domain.

Figure 3:
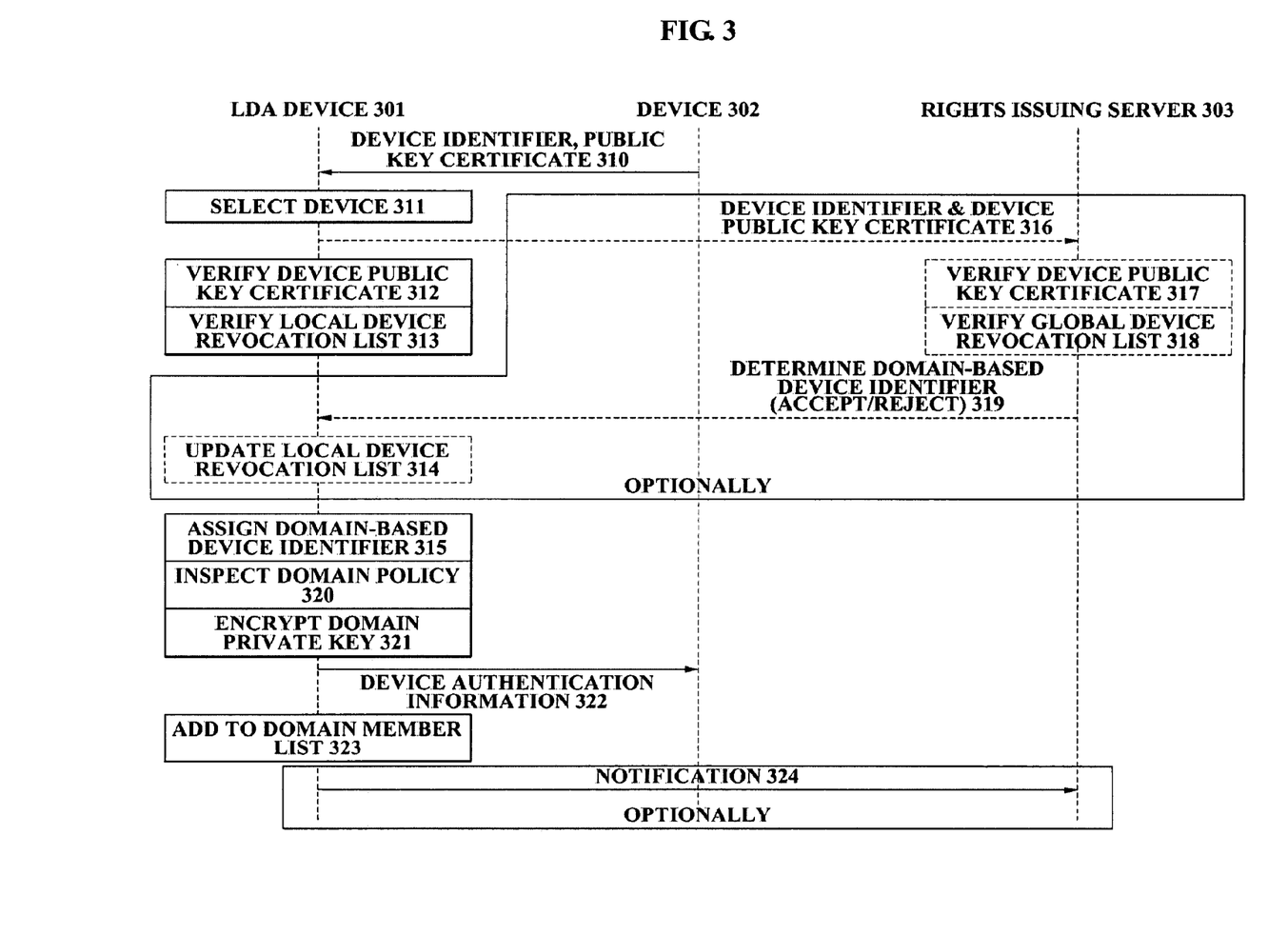
FIG. 3 is a flowchart illustrating a method of adding a device to a domain according to an exemplary embodiment of the present invention.

FIG. 3 is a flowchart illustrating a method of adding a device to a domain according to an exemplary embodiment of the present invention.

To add a device to a domain, a user discovers devices which are positioned in a limited location or distance from an LDA device 301, using the LDA device 301. When the user commands the LDA device 301 to discover the devices, the LDA device 301 requests the devices, which are positioned within the limited location or distance from the LDA device 301, to transmit a device identifier and a device public key certificate using its LLC interface. Each of the devices receives the request and transmits its device identifier and device public key certificate to the LDA device 301 using the LLC interface. Specifically, in operation 310, the LDA device 301 receives information of user devices 302 which are positioned in the limited location or distance from the LDA device 301, via the LLC interface.

In operation 311, the LDA device 301 provides the user with information about the discovered devices and receives a selection on a device to be registered as a member of the domain, from the user. As an example, when the LDA device 301 displays information of the discovered devices, the user may point and click any number of the displayed devices and thereby, command the LDA device 301 to add the selected device or devices to the domain. Such a "point and click" manner provides the user with a very familiar environment. In operations 312 through 319, the LDA device 301 authenticates each device which is selected as a member of the domain from the discovered devices. An authentication method depends upon an amount of delegated rights from a rights issuing server 303 to the LDA device 301.

When the rights issuing server 303 delegates full rights for an additional device authentication to the LDA device 301, the LDA device 301 verifies a device public key certificate of the selected device in operation 312. When the device public key certificate is not valid, the authentication fails. Also, in operation 313, the LDA device 301 inspects a local device revocation list. When the selected device is registered in the local device revocation list, the authentication fails. Also, the LDA device 301 may inspect a device identifier of the additionally selected device. When the authentication fails, the LDA device 301 notifies the user that the selected device may not be added to the domain. Also, when the authentication fails, the selected device is registered to the local device revocation list.

When the rights issuing server 303 delegates partial rights for the additional device authentication to the LDA device 301, the LDA device 301 transmits a device identifier and/or a device public key certificate of the selected device to the rights issuing server 303 in operation 316. In operation 317, the rights issuing server 303 verifies the device public key certificate of the selected device. Also, in operation 318, the rights issuing server 303 verifies whether the selected device is registered to a global device revocation list. The rights issuing server 303 may verify the device identifier of the additionally selected device.

When the authentication is successful, the rights issuing server 303 assigns a domain-based device identifier to the selected device. In operation 319, the rights issuing server 303 transmits the domain-based device identifier to the LDA device 301.

When the authentication fails, the rights issuing server 303 notifies the LDA device 301 that a negative decision about an addition of the selected device to the domain was made in operation 319. Also, when the authentication of the selected device fails, the rights issuing server 303 registers the selected device to the global device revocation list, and requests the LDA device 301 to update the local device revocation list. In this case, in operation 314, the LDA device 301 updates its local device revocation list.

When the authentication of the domain to be added is successful, the LDA device 301 assigns a domain-based device identifier in operation 315. Alternatively, the domain-based device identifier may be created in the rights issuing server 303. In this case, the LDA device 301 receives the domain-based device identifier from the rights issuing server 303. Accordingly, the LDA device 301 does not need to assign the domain-based device identifier. In this instance, the domain-based device identifier is used for enumerating devices of the domain in the domain.

In operation 320, the LDA device 301 inspects the domain policy. As an example, when the maximum number of devices which can join a domain is ten devices and ten devices have already joined the domain, an addition of a device is rejected according to the domain policy.

When the verifying of the domain policy is successful, the LDA device 301 encrypts the domain private key using the device public key of a user device 302 to be added to the domain in operation 321.

Also, the LDA device 301 signs 1) through 3), discussed below, with the LDA public key of the LDA device 301, namely 1) the domain-based device identifier which is assigned to the user device 302, 2) the LDA identifier which is assigned to the LDA device 301 by the rights issuing server 303, and 3) a hash value of the device public key certificate of the authenticated user device 302. In this instance, the domain-based device identifier is assigned by the LDA device 301 or the rights issuing server 303.

In operation 322, the LDA device 301 transmits device authentication information corresponding to the domain, to the authenticated user device 302. In this instance, the device authentication information is used for proving that the user device 302 has been authenticated in association with the domain. The authentication information may include:

(1) the LDA public key of the LDA device 301;
(2) the domain-based device identifier of the user device 302;
(3) the LDA identifier of the LDA device 301, wherein the LDA identifier is assigned by the rights issuing server 303; and
(4) a signal which is signed with the LDA private key of the LDA device 301 with respect to:
1) the domain-based device identifier which is assigned to the user device 302,
2) the LDA identifier which is assigned to the LDA device 301 by the rights issuing server 303, and
3) the hash value of the device public key certificate of the authenticated user device 302.

Also, the LDA device 301 transmits domain credentials corresponding to the domain to the authenticated user device 302. In this instance, the domain credentials may include at least one of 1) domain information about the domain, 2) an encrypted key which is encrypted with the public key of the authenticated user device 302 with respect to the domain private key of the domain, and 3) the domain public key certificate of the domain. Also, the domain information includes information about the domain, such as a domain name, a domain identifier, and the like. The domain credentials indicate whether the device has the rights to access a content of the domain, when the device accesses the content. As an example, when the device accesses the content that belongs to the domain, the device may access the content by sending the domain credentials to the device that maintains the content.

After transmitting all the information to the authenticated user device 302, the LDA device 301 registers the authenticated user device 302 as a member of the domain in operation 323. Namely, the LDA device 301 registers the authenticated user device 302 to a domain member list which is maintained in the LDA device 301. In this instance, the domain member list stores device authentication information and a device identifier of a member of the domain.

After registering the authenticated user device 302 as a member of the domain, the LDA device 301 may optionally notify the rights issuing server 303 of the domain-based device identifier which is assigned to the LDA device 301, and the device public key certificate of the LDA device 301 in operation 324.

Figure 4:
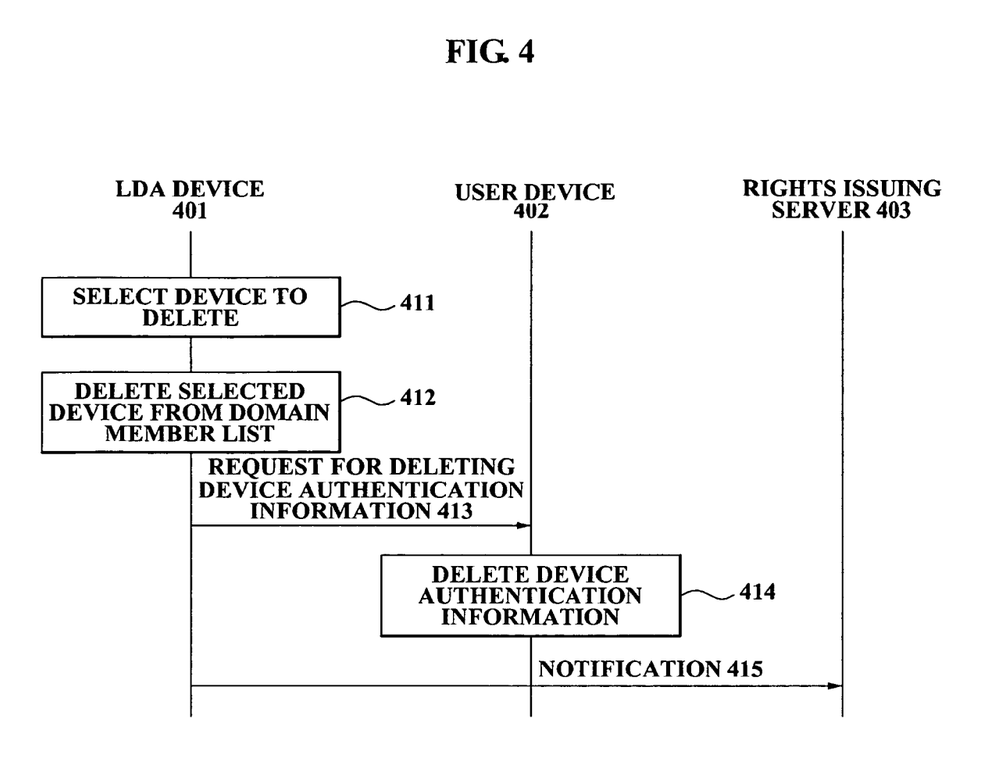
FIG. 4 is a flowchart illustrating a method of deleting a device from a domain according to an exemplary embodiment of the present invention.

FIG. 4 is a flowchart illustrating a method of deleting a device from a domain according to an exemplary embodiment of the present invention.

In operation 411, when a user desires to delete a user device 402 from a domain, the user selects a member of the domain to delete, using an LDA device 401 which manages the domain.

In operation 412, when a request for deleting the user device 402 from a member of the domain is received, the LDA device 401 deletes the user device 402 from a member of the domain. Namely, the LDA device 401 deletes device authentication information and a device identifier of the user device 402 which is maintained in the domain member list.

In operation 413, the LDA device 401 requests the user device 402 to delete device authentication information corresponding to the domain. Also, the LDA device 401 may request the user device 402 to delete other information of the domain. As an example, the LDA device 401 may request the user device 402 to delete domain information, such as a domain public key, a domain private key, and a domain public key certificate.

In response to the requests to delete device authentication information corresponding to the domain from the LDA device 401, the user device 402 deletes the device authentication information corresponding the domain in the user device 402 in operation 414.

In operation 415, the LDA device 401 may optionally notify the rights issuing server 403 that the user device 402 with a specific device identifier was deleted from a specific domain.

Figure 5:
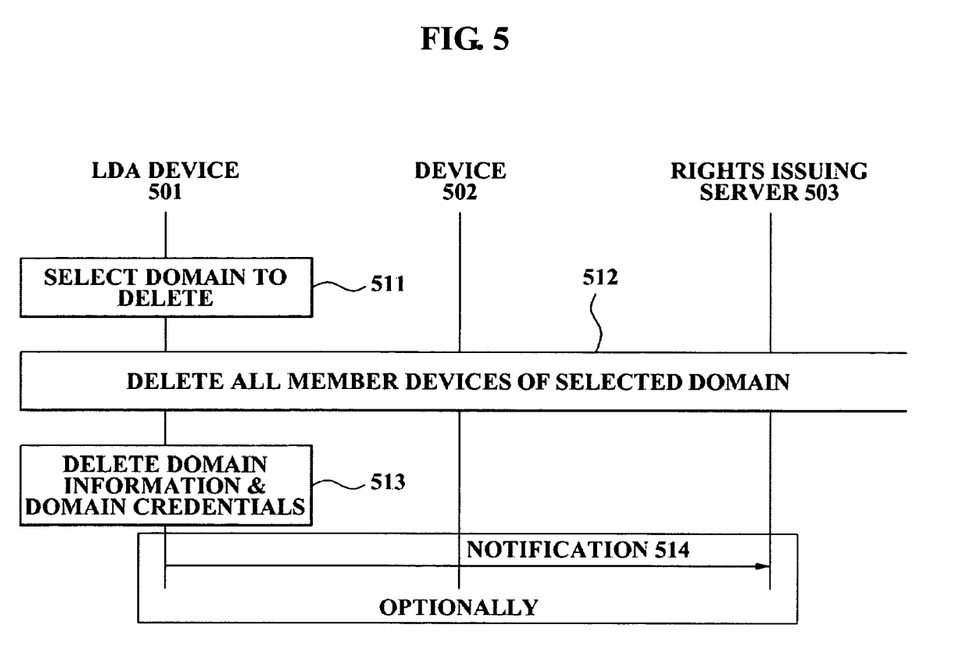
FIG. 5 is a flowchart illustrating a method of deleting a domain according to an exemplary embodiment of the present invention.

FIG. 5 is a flowchart illustrating a method of deleting a domain according to an exemplary embodiment of the present invention.

In operation 511, a user selects the domain to delete, from a list of domains which is maintained by an LDA device 501. In operation 512, the LDA device 501 deletes all the member devices of the selected domain. In this case, the method described with reference to FIG. 4 is used for deleting all the member devices of the selected domain. In this instance, the LDA device 501, a user device 502, or a rights issuing server 503 may be involved. Next, in operation 513, the LDA device 501 deletes its domain information and domain credentials. Optionally, in operation 514, the LDA device 501 may notify the rights issuing server 503 of a list of the deleted devices and information about the deleted domain. In this instance, a list of device identifiers of the deleted devices may be used for the list of the deleted devices. Also, the domain name or the domain identifier may be used for information about the deleted domain.

The domain management method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to an exemplary domain management method and device of the present invention, devices are not required to include an ability to access a network to utilize a domain function of DRM systems. The devices are allowed to utilize the domain function of DRM systems with only an LLC interface. Accordingly, since the inexpensive LLC interface, not an expensive network interface, is required for a large number of devices that need to access digital contents, manufacturing costs may be reduced.

Exemplary implementations of the present invention are resource-limited devices friendly. The present invention does not require the devices to have an Internet connection to enroll into a domain. To do that, only an LLC interface is required.

Also, according to an exemplary embodiment of the present invention, a device enrollment into a domain can be quickly performed. When an LDA device has all rights for a device authentication, all the processes of the device authentication are locally performed, resulting in fast performance. Also, since the authenticated devices are provided with authentication information, subsequent communications between the devices and other member devices may be easily authenticated.

Also, according to an exemplary embodiment of the present invention, a user may select a device to add to a domain, from discovered devices which are displayed on an LDA device, in a "point and click" manner. Accordingly, the user may very easily add the device to the domain.

Also, in the conventional art, devices to be added to a domain must be determined before creating the domain. However, according to an exemplary embodiment of the present invention, the domain may be created even when a single member device does not exist. Also, since addition and deletion of the domain is locally performed, the domain management may be performed more flexibly.

Although a few exemplary embodiments of the present invention have been shown and described, the present invention is not limited to the described exemplary embodiments. Instead, it should be appreciated by those skilled in the art that changes may be made to these exemplary embodiments without departing from the principles and spirit of the invention, the scope of which is defined by the claims and their equivalents.

What is claimed is:

1. A local domain authority device, comprising:
a location limited channel (LLC) interface configured to communicate wirelessly with a device positioned within a limited location;
a network interface configured to communicate with a device positioned outside of the limited location; and
a local domain authority (LDA) module for authenticating at least one device which is positioned within the limited location and is selected as a member of a domain, receiving domain credentials for the domain from a rights issuing server via the network interface, transmitting device authentication information, including the domain credentials corresponding to the domain, to the authenticated device via the LLC interface, and registering the authenticated device as a member of the domain,
wherein the device authentication information comprises a signature which is signed with an LDA private key of the local domain authority device with respect to each of:
a domain-based device identifier which is assigned to the authenticated device;
an LDA identifier which is assigned to the LDA device by a rights issue server; and
a hash value of a device public key certificate of the authenticated device.

2. The local domain authority device of claim 1, wherein the LLC interface receives a device identifier and a device public key certificate for the at least one device which is positioned within the limited location.

3. The local domain authority device of claim 1, wherein the LLC interface transmits and receives information for a plurality of devices which are positioned within a limited location, and the LLC interface receives a device identifier and a device public key certificate for each of the devices which are positioned within the limited location.

4. The local domain authority device of claim 1, wherein the LDA module provides a user with device information of the at least one device which is positioned in the limited location, and receives a selection regarding the at least one device to be registered as a member of the domain from the user.

5. The local domain authority device of claim 1, wherein the LLC interface transmits and receives information for a plurality of devices which are positioned within a limited location, the LDA module provides a user with device information of the each of the devices which are positioned in the limited location, and the LDA module receives a selection regarding each of the devices to be registered as a member of the domain from the user.

6. The local domain authority device of claim 1, wherein the LDA module registers the selected device to a local revocation list, if the authentication of the selected device fails.

7. The local domain authority device of claim 1, wherein the LLC interface transmits and receives information for a plurality of devices which are positioned within a limited location, and the LDA module registers each of the selected devices to a local revocation list, if the authentication of the selected devices fails.

8. The local domain authority device of claim 1, wherein the device authentication information comprises at least one of:
domain information about the domain;
an encrypted key which is encrypted with a public key of the authenticated device with respect to a domain private key of the domain; and
a domain public key certificate of the domain.

9. The local domain authority device of claim 1, wherein the LDA module registers the authenticated device as a member of the domain by storing the device authentication information and a device identifier of the authentication device, in the domain member list, which is maintained in the LDA device.

10. The local domain authority device of claim 9, wherein the LDA module, in response to a request for deleting a first device as a member of the domain, deletes the first device from the domain member list, and transmits a request for deleting device authentication information corresponding to the domain, to the first device.

11. The local domain authority device of claim 9, wherein the LDA module registers the one or more authenticated device as a member of the domain, and transmits a domain-based device identifier assigned to the authenticated device and a device public key certificate of the authenticated device, to the rights issuing server.

12. The local domain authority device of claim 11, wherein the LDA module transmits a device identifier of a first device to the rights issuing server, when the first device is deleted as a member of the domain.

13. The local domain authority device of claim 1, wherein the LDA module transmits at least one of a device identifier of the LDA device, a device public key certificate of the LDA device, and domain information to the rights issuing server, in response to a receipt of the domain information about creation of the domain from a user.

14. The local domain authority device of claim 1, wherein the LDA module receives at least one of a domain private key of the domain, an LDA public key, an LDA private key, an LDA public key certificate, and the domain credentials from the rights issuing server.

15. The local domain authority device of claim 14, wherein the domain credentials comprise a domain public key, the domain private key, and a domain public key certificate.

16. The local domain authority device of claim 1, wherein the LDA, in response to a request for deleting the domain, deletes devices which are registered as members of the domain, from the domain, and deletes domain information of the domain which is stored in the LDA module.

17. A domain management method, comprising:
receiving information, at a local domain authority (LDA) device, of at least one device, which is positioned within a limited location from the LDA device via a location limited channel (LLC) interface configured to communicate wirelessly with a device positioned within the limited location;
receiving domain credentials for the domain from a rights issuing server via a network interface configured to communicate with a device positioned outside the limited location;
authenticating the at least one device which is positioned within the limited location and is selected as a member of a domain;
transmitting device authentication information, including the domain credentials corresponding to the domain, to the authenticated device; and
registering the authenticated device as a member of the domain,
wherein the device authentication information comprises a signature which is signed with an LDA private key of the local domain authority device with respect to each of:
a domain-based device identifier which is assigned to the authenticated device;
an LDA identifier which is assigned to the LDA device by a rights issue server; and
a hash value of a device public key certificate of the authenticated device.

18. The method of claim 17, wherein the receiving of the information comprises receiving a device identifier and a device public key certificate of the at least one device which is positioned in the limited location from the LDA device, via the LLC interface.

19. The method of claim 17, wherein information is received from a plurality of devices and further wherein the receiving of the information comprises receiving a device identifier and a device public key certificate of each of the plurality of devices which are positioned within the limited location from the LDA device, via the LLC interface.

20. The method of claim 17, wherein the authenticating of the selected device further comprises:
providing a user with information of the at least one device positioned within the limited location; and
receiving a selection on the device to be registered as a member of the domain, from the user.

21. The method of claim 17, wherein the authenticating of the selected device further comprises:
verifying a device public key certificate of the selected device in the LDA device.

22. The method of claim 17, wherein the authenticating of the selected device further comprises:
determining whether the selected device is registered in a local revocation list of the LDA device; and
registering the selected device in the local revocation list, when the authentication of the selected device fails.

23. The method of claim 17, wherein the authenticating of the selected device further comprises:
verifying a device public key certificate of the selected device in the rights issuing server.

24. The method of claim 17, wherein the authenticating of the selected device further comprises:
determining whether the selected device is registered in a global revocation list of a right issuer server;
registering the selected device in the global revocation list, when the authentication of the selected device fails; and
requesting the LDA device to update a local revocation list of the LDA device.

25. The method of claim 17, wherein the domain credentials comprises at least one of:
domain information about the domain;
an encrypted key which is encrypted with a public key of the authenticated device with respect to a domain private key of the domain; and
a domain public key certificate of the domain.

26. The method of claim 25, wherein the domain information includes a domain name of the domain.

27. The method of claim 17, wherein the registering of the authenticated device comprises registering the authenticated device as a member of the domain by storing the device authentication information and a device identifier of the authenticated device in a domain member list which is maintained in the LDA device.

28. The method of claim 27, further comprising:
receiving a request for deleting a first device as a member of the domain;
deleting the first device from the domain member list; and
transmitting a request for deleting device authentication information corresponding to the domain to the first device.

29. The method of claim 17, further comprising:
transmitting at least one of a domain-based device identifier assigned to the authenticated device and a device public key certificate of the authenticated device to the rights issuing server.

30. The method of claim 29, further comprising:
transmitting a device identifier of a first device to the rights issuing server, when the first device is deleted as a member of the domain.

31. A non-transitory computer-readable medium having embodied thereon a computer program for a method of managing a domain, the computer program comprising:
a first set of instructions for receiving information, at a local domain authority (LDA) device, of at least one device positioned within a limited location from the LDA device via a location limited channel (LLC) interface configured to communicate wirelessly with a device positioned within the limited location;

a second set of instructions for receiving domain credentials for a domain from a rights issuing server via a network interface configured to communicate with a device positioned outside the limited location;

a third set of instructions for authenticating the at least one device which is positioned within the limited location and is selected as a member of a domain;

a fourth set of instructions for transmitting device authentication information, including the domain credentials corresponding to the domain, to the authenticated device; and a fifth set of instructions for registering the authenticated device as a member of the domain wherein the device authentication information comprises a signature which is signed with an LDA private key of the local domain authority device with respect to each of:
a domain-based device identifier which is assigned to the authenticated device;
an LDA identifier which is assigned to the LDA device by a rights issue server; and
a hash value of a device public key certificate of the authenticated device.

32. The computer-readable medium of claim 31, wherein the first set of instructions comprises instructions for receiving a device identifier and a device public key certificate of the at least one device which is positioned in the limited location from the LDA device, via the LLC interface.

33. The computer readable medium of claim 31 wherein the first set of instructions comprises instructions for receiving information of a plurality of devices and further wherein the first set of instructions comprises instructions for receiving a device identifier and a device public key certificate of each of the plurality of devices which is positioned in the limited location from the LDA device, via the LLC interface.

34. The computer-readable medium of claim 31, wherein the third set of instructions for authenticating the at least one selected device further comprises:
a fifth set of instructions for providing a user with information of the at least one device positioned within the limited location; and
a sixth set of instructions for receiving a selection on the device to be registered as a member of the domain, from the user.

35. The computer-readable medium of claim 31, wherein the third set of instructions for authenticating a selected device further comprises:
a seventh set of instructions for verifying a device public key certificate of the selected device in the LDA device.

36. The computer-readable medium of claim 31, wherein the third set of instructions for authenticating at least one selected device further comprises:

an eighth set of instructions for determining whether the selected device is registered in a local revocation list of the LDA device; and
a ninth set of instructions for registering the selected at least one device in the local revocation list, when the authentication of the selected device fails.

37. The computer-readable medium of claim 31, wherein the third set of instructions for authenticating one or more selected device further comprises:
a tenth set of instructions for verifying a device public key certificate of the selected device in the rights issuing server.

38. The computer-readable medium of claim 31, wherein the third set instructions for authenticating one or more selected device further comprises:
an eleventh set of instructions for determining whether the selected device is registered in a global revocation list of a right issuer server;
a twelfth set of instructions for registering the selected device in the global revocation list, when the authentication of the selected device fails; and
a thirteenth set of instructions for requesting the LDA device to update a local revocation list of the LDA device.

39. The computer-readable medium of claim 31, wherein the fourth set of instructions for registering of the authenticated device comprises a fourteenth set of instructions for registering the authenticated device in a domain member list which is maintained in the LDA device.

40. The computer-readable medium of claim 39, wherein the domain member list comprises device authentication information and device identification information of at least one member of the domain.

41. The computer-readable medium of claim 39, further comprising:
a fifteenth set of instructions for receiving a request for deleting a first device as a member of the domain;
a sixteenth set of instructions for deleting the first device from the domain member list; and
a seventeenth set of instructions for transmitting a request for deleting device authentication information corresponding to the domain to the first device.

42. The computer-readable medium of claim 31, further comprising:
an eighteenth set of instructions for transmitting at least one of a domain-based device identifier assigned to the authenticated device and a device public key certificate of the authenticated device to the rights issuing server.

43. The computer-readable medium of claim 42, further comprising:
a nineteenth set of instructions for transmitting a device identifier of a first device to the rights issuing server, when the first device is deleted as a member of the domain.

* * * * *